United States Patent
Haffner et al.

(12) 
(10) Patent No.: US 6,318,891 B1
(45) Date of Patent: Nov. 20, 2001

(54) METHOD OF TEMPERATURE MEASUREMENT BY CORRELATION OF CHEMILUMINESCENT SPECTRUM EMITTED BY A FLAME WITH STORED THEORETICAL EMISSION SPECTRA FOR OH AND/OR CH RADICALS

(75) Inventors: Ken-Yves Haffner; Matthias Höbel, both of Baden (CH)

(73) Assignee: ABB Research Ltd., Zurich (CH)

( * ) Notice: Subject to any disclaimer, the term of this patent is extended or adjusted under 35 U.S.C. 154(b) by 0 days.

(21) Appl. No.: 09/230,847
(22) PCT Filed: Jun. 24, 1997
(86) PCT No.: PCT/CH97/00247
§ 371 Date: Feb. 2, 1999
§ 102(e) Date: Feb. 2, 1999
(87) PCT Pub. No.: WO98/07013
PCT Pub. Date: Feb. 19, 1998

(30) Foreign Application Priority Data

Aug. 9, 1996 (DE) .............................. 196 32 174

(51) Int. Cl.$^7$ .................................... G01J 3/457
(52) U.S. Cl. .................... 374/121; 374/144; 374/161; 123/406.28
(58) Field of Search .................... 374/120, 121, 374/124, 137, 141, 144, 147, 148, 161; 123/435, 406.28; 431/79; 250/372; 356/315, 417; 73/116

(56) References Cited

U.S. PATENT DOCUMENTS

| 4,394,575 | 7/1983 | Nelson ................................ 250/343 |
| 4,653,998 | * 3/1987 | Sohma et al. .......................... 431/79 |

(List continued on next page.)

FOREIGN PATENT DOCUMENTS

| 2736417 | 4/1978 | (DE) . |
| 4028922A1 | 6/1991 | (DE) . |
| 4307187A1 | 9/1993 | (DE) . |
| G9116736.1 | 9/1993 | (DE) . |
| 4305645A1 | 8/1994 | (DE) . |
| 60036825 | 2/1985 | (JP) . |
| 63040824 | 2/1988 | (JP) . |

OTHER PUBLICATIONS

"Flame temperature determination," Instruments & Control Systems, vol. 33, May 1960, p. 321.*

"A1740 Grating Flame Photometer", Bendix Scientific Instruments and Vacuum Division, received Nov. 1968.*

Rotational Temperature Estimation of CO at High Temperatures by Graphical Methods Using FT–IR Spectrometry, McNesby, et al., Applied Spectroscopy, vol. 45, No. 1, Jan. 1991, pp. 61–67.

(List continued on next page.)

*Primary Examiner*—John Barlow
*Assistant Examiner*—Stanley J. Pruchnic, Jr.
(74) *Attorney, Agent, or Firm*—Burns, Doane, Swecker & Mathis, L.L.P.

(57) ABSTRACT

In a temperature measurement method for determining the adiabatic temperature of a flame, in particular in the combustion chamber of a gas turbine, the chemiluminescence radiation from the flame, emitted by OH radicals and CH radicals, is detected using a spectrograph via an optical sensor fiber. The spectrally resolved raw signal of the chemiluminescence radiation is then corrected and compared with a multiplicity of theoretically determined emission spectra, until a theoretical emission spectrum coincides with the chemiluminescence spectrum. The Boltzmann temperature associated with this coinciding emission spectrum is then assigned to the chemiluminescence spectrum, the adiabatic flame temperature being derived from the Boltzmann temperature by correlation.

7 Claims, 1 Drawing Sheet

U.S. PATENT DOCUMENTS

| | | | |
|---|---|---|---|
| 4,790,652 | * | 12/1988 | Uneus et al. .......................... 356/315 |
| 4,964,725 | | 10/1990 | Goldovsky et al. ................. 356/308 |
| 5,148,667 | * | 9/1992 | Morey ................................. 60/39.02 |
| 5,317,165 | | 5/1994 | Montagna ............................ 250/554 |
| 5,480,298 | * | 1/1996 | Brown ................................... 431/79 |
| 5,551,780 | * | 9/1996 | Wintrich et al. .................... 374/121 |
| 5,659,133 | * | 8/1997 | Sims et al. ............................. 73/116 |
| 6,071,114 | * | 6/2000 | Cusack et al. ......................... 431/79 |

OTHER PUBLICATIONS

"Apparatus for studying premixed laminar flames using mass spectrometry and fiber–optic spectrometry", Olsson, et al., Rev. Sci. Instrum. 61(3), Mar. 1990, pp. 1029–1037.

"Quantitative analysis of remote gas temperatures and concentrations from their infrared emission spectra", Hilton, et al., Meas. Sci. Technol. 6 (1995), pp. 1236–1241.

"Anwendungen von faseroptischen Sensoren", Sensoren, Hauptmann, pp. 76–83.

* cited by examiner

METHOD OF TEMPERATURE MEASUREMENT BY CORRELATION OF CHEMILUMINESCENT SPECTRUM EMITTED BY A FLAME WITH STORED THEORETICAL EMISSION SPECTRA FOR OH AND/OR CH RADICALS

This application is a National Stage Application of PCT International Application No. PCT/CH97/00247, filed Jun. 24, 1997. The PCT International Application claims priority from German Patent Application No. 196 32 174.3, filed Aug. 9, 1996.

FIELD OF THE INVENTION

The present invention concerns the field of combustion technology. It relates to a method for flame temperature measurement and to a device for carrying out the method.

TECHNICAL BACKGROUND

Since the beginning of research into the field of combustion technology, great importance has been placed on the determination of flame temperatures. The flame temperature is a key parameter in the combustion of fossil fuels, since it correlates directly with the chemical reaction kinetics and the formation of pollutants, for example $NO_x$. Moreover, knowledge of the release of energy during the combustion process is indispensable for designing combustion chambers and determining mechanical and thermal stresses on all the components that are involved.

There are currently a multiplicity of techniques for measuring flame temperatures. In this context, the extreme working conditions are, in particular, very challenging to temperature sensors, and so it does not directly follow that any temperature sensor tested under neat laboratory conditions can be employed in an industrial combustion chamber.

Contemporary temperature measurement techniques can be broadly divided into two categories, one of which uses non-optical temperature sensors and the other optical ones.

Included among non-optical temperature measurement devices are point sensors which, for example, comprise thermocouples. They afford a simple and economical possibility of determining temperature at discrete points, but need to be installed in direct proximity to the flame, and therefore affect the flame. In addition, because of their fragility, thermocouples are of only limited use in a turbulent high-temperature environment, in which chemical surface reactions additionally damage the thermocouples.

In particular since laser technology has become known, a large number of optical temperature measurement devices with correspondingly tailored measurement methods have been developed. Amongst others, these include absorption and fluorescence methods, as well as various measurement methods which make use of the scattered laser light. A common factor with the abovementioned optical measurement methods is that they need a light source, namely a laser. They are therefore active in nature, but in contrast to thermocouples, they have no effect on the flame. These methods infer the temperature of a flame while taking into account the light emitted by the source and the measurement volume. However, this technique is expensive in view of the measuring devices that are used and the costs resulting therefrom. Commercial use of such laser-assisted measuring systems is therefore very limited.

A known non-active optical flame temperature determination is carried out by means of pyrometry, use being made of black-body radiation emitted by soot particles contained in the flame. However, it is difficult to use pyrometric temperature measurement systems for flames of gaseous fuels. The optical system is in this case very weak because of the low soot content. During the signal analysis, a further difficulty arises since the temperature- and wavelength-dependent emissivities of the radiating soot particles is only approximately known, which, in combination with undesired absorption effects on the path leading to the detector, impair the accuracy of the method.

JP-A-60 036 825 discloses a temperature measurement method for determining the temperature of a flame. In this method, the vibration spectrum of the OH radicals is measured in order to determine the temperature. For this, the emission intensity of discrete spectral lines of the OH radical transition is determined by spectral analysis.

The article "Rotational Temperature Estimation of CO at High Temperatures by Graphical Methodes Using FT-IR-Spectrometry", of Mc Nesby et al., published in "Applied Spectrometry", vol. 45, no. 1, 1. January 1991, discloses a method for determining the temperature by determining the rotational spectra of CO in a flame. For this, the line spectra of a single R-Branch is determined, which is submitted to a correction.

In summary, it can be stated that currently available flame temperature measurement methods are of only limited industrial use, since either they are cost-intensive, or they do not ensure sufficient stability at the required accuracy, in view of contamination.

SUMMARY OF THE INVENTION

Accordingly, one object of the invention is to provide a novel optical flame temperature measurement method and device for carrying out the method, of the type mentioned at the start, and to develop them so as to provide economical and accurate flame temperature determination with high stability, this temperature determination remaining substantially unaffected by contamination, and being economically viable in combustion chambers that are used industrially.

The crux of the invention consists in that the chemiluminescence radiation of the OH radicals and/or CH radicals which occurs in a flame is spectrally detected and then compared with a multiplicity of theoretically determined emission spectra for various Boltzmann temperatures, until coincidence between the measured chemiluminescence spectrum and an emission spectrum is established. The coinciding theoretical emission spectrum is characterized by a unique Boltzmann temperature. The adiabatic flame temperature is then derived from the Boltzmann temperature by means of correlation.

The advantages of the invention consist, amongst other things, in that the temperature measurement method according to the invention is independent of wavelength-dependent background effects which, by means of correction, are filtered out from the raw signal of the chemiluminescence radiation.

It is particularly expedient if, before the comparison, the chemiluminescence spectrum and the multiplicity of theoretically determined emission spectra are normalized to their respective maximum. This makes any possible contamination of the optical measurement sensors that are used for detecting the chemiluminescence radiation substantially unimportant for the determination of the flame temperature.

BRIEF DESCRIPTION OF THE DRAWINGS

The invention is described in more detail to the following by reference to an embodiment. The drawing shows in the single FIG. 1 a block diagram for carrying out the temperature measurement method.

DESCRIPTION OF THE PREFERRED EMBODIMENT

Figure 1:
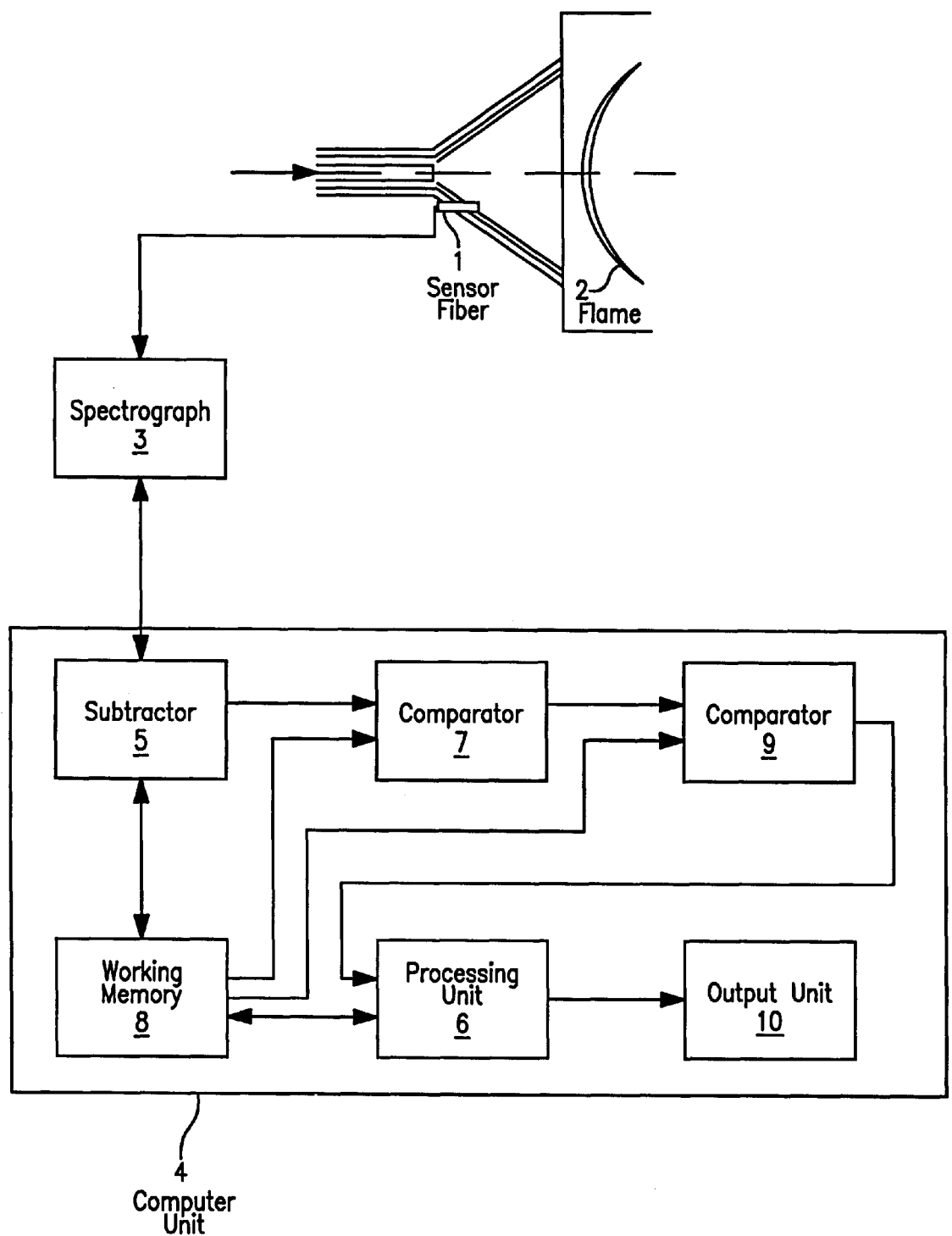

Referring now to the drawing, the single figure shows that the chemiluminescence radiation emitted by OH radicals and/or CH radicals in a flame 2 is fed via a sensor fiber 1 to a spectrograph 3 which analyzes the spectral composition. The spectrograph 3 is tuned to a working range in the near UV. During the measurement, an adjustable section of the spectrum, with a width of about 70 nm, is acquired with a resolution of 0.3 nm, to be precise 270–340 nm for OH radicals and 390–460 nm for CH radicals. The spectrograph is driven by a computer unit 4 as regards the exposure time and the number of averages over a multiplicity of measurements.

In a first process step, the spectrally resolved chemiluminescence raw signal that is measured is firstly corrected in a subtractor for the background effects that are contained in this raw signal. In order to avoid misinterpretations, it is essential to have the most exact and reproducible determination of the background effects for this. At various selected wavelengths, which lie in spectral gaps relative to the OH radical and CH radical spectral lines to be evaluated, the intensity of the background is determined, from which the actual shape of the background radiation is approximated with the aid of a correlation in a processing unit 6 from a polynomial fit and a cubic spline. The wavelength-dependent background radiation is then subtracted from the chemiluminescence raw signal in the subtractor 5.

The resulting, corrected chemiluminescence signal is then normalized to its maximum value, which is at 309 nm for OH and at 430 nm for CH.

In a further process step, the corrected chemiluminescence spectrum is compared in a first comparator 7 with a multiplicity of theoretically determined emission spectra. This multiplicity of emission spectra is in this case created beforehand as a sort of catalog, which, in suitable temperature intervals, contains a theoretical emission spectrum of the OH and CH radicals for each Boltzmann temperature. In this case, the Boltzmann temperature characterizing these theoretical emission spectra corresponds to an equivalent equilibrium temperature for the rotational and vibrational degrees of freedom of the OH and CH radicals.

Each theoretical emission spectrum is given by superposing a multiplicity of spectral lines (about 600 spectral lines for OH radicals, and about 1800 for CH radicals), which are assigned to characteristic radical transitions from an excited state to the ground state. The data for the characteristic radical transitions, the transition probabilities and the associated molecular parameters are taken from the relevant literature, for example Lifbase V.0.99 Software Package of I. Luque and D.R. Crosley, SRI International, 1994.

After the superposition of the individual lines for each Boltzmann temperature, the resulting theoretically determined emission spectra are also normalized to their respective maximum. The comparison between the corrected chemiluminescence spectrum and the theoretical emission spectra from the catalog then takes place. The first comparator is provided with this catalog by a memory unit 8 before the comparison. The comparison procedure is carried out until a decision criterion for an optimal coincidence between the measured chemiluminescence spectrum and a theoretical emission spectrum is met. The Boltzmann temperature associated with the theoretical emission spectrum that is found is determined in a second comparator 9 and subsequently assigned to the chemiluminescence spectrum as well.

For the final process step to determine the adiabatic flame temperature, use is made of a correlation between the Boltzmann temperature and the adiabatic flame temperature, this correlation to be determined beforehand, once only, in the processing unit 6. To this end, the Boltzmann temperatures for the OH and/or CH radicals were determined under various burner conditions, these Boltzmann temperatures being compared against associated, conventionally determined adiabatic flame temperatures. The correlation formed by this is then used to determine the adiabatic flame temperature using the Boltzmann temperature derived from the above comparison process. The adiabatic flame temperature is output in the output unit 10.

The mean deviation of the flame temperature measurement according to the described method by using chemiluminescence radiation is given at ±10K, which value should be understood as a maximum error, in which all these systematic errors are accumulated.

A particular advantage with the normalization of the theoretical emission spectra and the measured chemiluminescence spectra is the avoidance of errors which are caused by fluctuations in the absolute flame intensity. This also includes the aging of the sensor fiber as well as the deposition of combustion products on the end face of the fiber.

A decisive advantage is that, if the spectral range is selected appropriately, the chemiluminescence radiation and the background effects are detected simultaneously. Conventional optical measurement methods, which acquire a spectrum by scanning, or determine chemiluminescence radiation and background effects in two separate steps, do not take into account the fact that the contribution of the background effects may be determined erroneously owing to pulsations of the flame.

In comparison with measurement methods which acquire a spectrum by scanning, the temperature measurement method according to the invention permits a reduction in the computing time by two orders of magnitude, which reduces the time taken for flame temperature determination with contemporary computer systems to less than one second. In connection with this, it is of decisive importance that the entire catalog of the theoretical emission spectra has already been created in a single step, while taking into account the specific parameters of the measuring system that is used (resolution, spectral sensitivity), and can then be loaded into the working memory of a processing unit at the start of the measurement. This drastically reduces the time taken for the comparison procedure.

It is particularly advantageous if the chemiluminescence radiation is detected immediately downstream of the flame front. The self-absorption within a flame can then be ignored.

Of course, the invention is not restricted to the illustrative embodiment which has been presented and described. Thus, it is also conceivable according to the invention to use the chemiluminescence radiation of radicals other than OH or CH radicals in the described method.

In addition, the subject of the invention can also be used to determine the air-fuel ratio ($\lambda$) of a burner, since the flame temperature correlates with this air-fuel ratio. For this application, in a step which should be carried out beforehand, the correlation between the air-fuel ratio of a burner and the Boltzmann temperature is determined. In similar fashion to the determination of the adiabatic flame temperature, the instantaneous fuel/air mixing ratio can be determined in less than one second from the known correlation between the Boltzmann temperature and the air-fuel ratio of the burner. Using this fuel/air mixing ratio, it is then possible to use an active control unit to adjust the fuel/air throughput. The accuracy in determining the air-fuel ratio is about 1%.

LIST OF DESIGNATIONS

1 Sensor fiber
2 flame
3 spectrograph
4 computer unit
5 subtractor
6 processing unit
7,9 comparator
8 working memory
10 output unit

What is claimed is:

1. A temperature measurement method for determining the adiabatic temperature of a flame, the chemiluminescence radiation from the flame, emitted by OH radicals and CH radicals, being detected using a spectrograph via an optical sensor fiber, wherein a spectrally resolved raw signal of the chemiluminescence radiation is subjected to a correction, the method comprising the steps of:

comparing the spectrum of the corrected chemiluminescence radiation with a multiplicity of theoretically determined emission spectra, until a theoretical emission spectrum coincides with the corrected chemiluminescence spectrum, wherein each of the theoretically determined emission spectra is given by superposing a multiplicity of spectral lines;

the coinciding emission spectrum delivering a Boltzmann temperature which is associated with it and is assigned to the chemiluminescence spectrum; and deriving the adiabatic flame temperature from the Boltzmann temperature by means of correlation.

2. The temperature measurement method as claimed in claim 1, further comprising correcting the raw signal of the chemiluminescence radiation by subtracting wavelength-dependent background effects.

3. The temperature measurement method as claimed in claim 1, further comprising normalizing the corrected chemiluminescence spectrum to its maximum.

4. The temperature measurement method as claimed in claim 1, further comprising normalizing the multiplicity of the theoretically determined emission spectra to their maximum.

5. The temperature measurement method as claimed in claim 1, further comprising theoretically determining the multiplicity of emission spectra at a multiplicity of Boltzmann temperatures for the rotational and vibrational degrees of freedom of OH radicals and CH radicals before the comparison with the chemiluminescence spectrum is carried out.

6. The method of claim 1, wherein the flame is in a combustion chamber of a gas turbine.

7. A device for determining the adiabatic temperature of a flame, the device comprising:

a spectrograph;

an optical sensor fiber connected to the spectrograph; a subtractor connected to the spectrograph, the subtractor subtracting background effects from a chemiluminescence spectrum measured by the spectrograph; an output unit;

a first comparator, a second comparator and a processing unit arranged in series between the subtractor and the output unit, the measured chemiluminescence spectrum being compared in the first comparator with theoretically determined emission spectra to find a theoretically determined emission spectrum that coincides with the measured chemiluminescence spectrum, the found theoretically determined emission spectrum being assigned a Boltzmann temperature in the second comparator, and an adiabatic flame temperature being determined from the Boltzmann temperature in the processing unit; and a working memory;

wherein the first comparator, the second comparator and the processing unit are functionally connected to the working memory, and the processing unit is functionally connected to the subtractor.

* * * * *